United States Patent
Herrero et al.

(10) Patent No.: US 9,647,982 B2
(45) Date of Patent: *May 9, 2017

(54) PEER TUNNELING FOR REAL-TIME COMMUNICATIONS

(71) Applicant: Oracle International Corporation, Redwood Shores, CA (US)

(72) Inventors: Rolando Herrero, Derry, NH (US); Henry Katz, Brookline, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/636,755

(22) Filed: Mar. 3, 2015

(65) Prior Publication Data

US 2016/0261557 A1 Sep. 8, 2016

(51) Int. Cl.
*H04L 29/06* (2006.01)
*H04L 29/12* (2006.01)
*H04M 7/00* (2006.01)
*H04L 29/08* (2006.01)

(52) U.S. Cl.
CPC ........ *H04L 61/2592* (2013.01); *H04L 63/029* (2013.01); *H04L 63/0272* (2013.01); *H04L 65/1069* (2013.01); *H04L 67/104* (2013.01); *H04M 7/0063* (2013.01); *H04L 61/1529* (2013.01); *H04L 61/2514* (2013.01); *H04L 63/0236* (2013.01)

(58) Field of Classification Search
CPC ..... H04L 63/04; H04L 63/0272; H04L 65/80; H04L 65/4015; H04L 65/602; H04L 45/24; H04L 63/162
See application file for complete search history.

(56) References Cited

U.S. PATENT DOCUMENTS 6,349,336 B1 * 2/2002 Sit ........................ G06F 21/305
709/227
6,977,896 B1 12/2005 Kobayashi
7,136,377 B1 11/2006 Tweedly et al.
(Continued)

OTHER PUBLICATIONS

Oracle Communications; Oracle Data Sheet; "Acme Packet 4500"; http://www.oracle.com/us/industries/communications/acme-packet-4500-ds-1990148.pdf; last downloaded Oct. 20, 2014.
(Continued)

*Primary Examiner* — Harunur Rashid
(74) *Attorney, Agent, or Firm* — Miles & Stockbridge P.C.

(57) ABSTRACT

A system performs peer tunneling for real time communication ("RTC"). The system receives, by a tunneling server, a peer service request message from a first user equipment ("UE") indicating a request for establishing a peer tunnel between the first UE and a second UE. The system determines whether tunneling service is available at the second UE. When tunneling service is available at the second UE, the system sends a first peer service response message back to the first UE including remote tunnel parameters corresponding to the second UE. When tunneling service is not available at the second UE, the system sends a second peer service response message back to the first UE indicating a failed tunnel creation.

16 Claims, 5 Drawing Sheets

(56) References Cited

U.S. PATENT DOCUMENTS

| | | | |
|---|---|---|---|
| 8,080,324 B2* | 12/2011 | Yamamoto | C23C 14/0021 |
| | | | 204/192.1 |
| 9,021,134 B1 | 4/2015 | Patel | |
| 9,071,514 B1* | 6/2015 | Hegde | H04L 41/0668 |
| 2002/0114333 A1 | 8/2002 | Xu et al. | |
| 2002/0122416 A1* | 9/2002 | Xu | H04L 29/125 |
| | | | 370/352 |
| 2005/0076126 A1 | 4/2005 | Knight et al. | |
| 2011/0099619 A1* | 4/2011 | Jewell | H04L 63/08 |
| | | | 726/11 |
| 2011/0202610 A1* | 8/2011 | Chaturvedi | H04L 61/2589 |
| | | | 709/206 |
| 2013/0283037 A1* | 10/2013 | Katz | H04L 63/04 |
| | | | 713/151 |
| 2015/0188943 A1 | 7/2015 | Williams et al. | |
| 2015/0382240 A1 | 12/2015 | Hecht et al. | |

OTHER PUBLICATIONS

3rd Generation Partnership Project; Technical Specification Group Services and System Aspects; Study on firewall traversal (Stage 2) (Release 12); 3GPP TR 33.830 Vo. 5.0 (Nov. 2013).

* cited by examiner

PEER TUNNELING FOR REAL-TIME COMMUNICATIONS

FIELD

One embodiment is directed generally to a communications network, and in particular, to delivering real-time traffic over a communications network.

BACKGROUND INFORMATION

Many enterprises have moved from telephony services using the Public Switched Telephone Network ("PSTN") (provided by a traditional telephone company) to telephony services using the Internet Protocol ("IP") (provided by an IP Telephony service provider). Such services are commonly known as Voice over IP ("VoIP") or IP Telephony. IP Telephony uses an IP network (e.g., the Internet) as a backbone and can thus provide advanced features such as video conferencing, call recording, and call forwarding.

SUMMARY

One embodiment is a system that performs peer tunneling for real time communication ("RTC"). The system receives, by a tunneling server, a peer service request message from a first user equipment ("UE") indicating a request for establishing a peer tunnel between the first UE and a second UE. The system determines whether tunneling service is available at the second UE. When tunneling service is available at the second UE, the system sends a first peer service response message back to the first UE including remote tunnel parameters corresponding to the second UE. When tunneling service is not available at the second UE, the system sends a second peer service response message back to the first UE indicating a failed tunnel creation.

DETAILED DESCRIPTION

One embodiment provides real-time communications ("RTC") services in a network environment by performing dynamic peer tunneling between end users. In one embodiment, a server dynamically instructs tunnel clients to bypass the server and perform ad-hoc peer tunneling for direct RTC. Accordingly, by bypassing the server, this embodiment results in lower degrees of impairments (e.g., latency, packet loss, jitter, etc.), thus addressing RTC requirements such as call quality.

Figure 1:
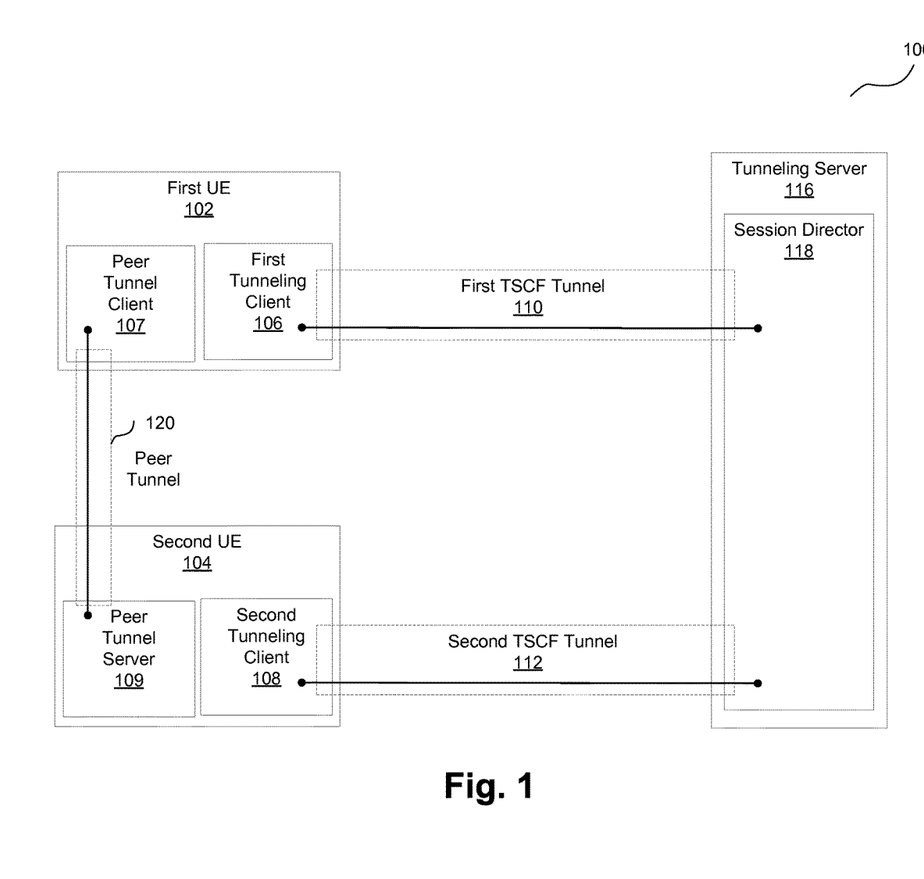
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a first user equipment ("UE") 102 that performs RTC with a second UE 104 over an Internet Protocol ("IP") network and through a peer tunnel 120. RTC refers to a mode of communication in which users exchange information instantly or with negligible latency. Example applications for RTC include voice and/or video calls, application streaming, softphones, and remote desktop applications. First UE 102 and second UE 104 may be any device used by an end-user for communication, such as a smartphone, a laptop computer, a tablet, etc.

Network 100 further includes a tunneling server 116 that provides functionality for establishing and managing tunnels with first UE 102 and second UE 104 according to the Tunneled Services Control Function ("TSCF") standard as described in, for example, $3^{rd}$ generation partnership program ("3GPP") technical report ("TR") 33.830 V0.5.0 incorporated herein by reference. In general, using a tunnel for communication refers to using a delivery protocol to encapsulate a different payload protocol. The TSCF standard provides client side and server side network elements for establishing managed Transport Layer Security ("TLS") tunnels for performing RTC. TLS is a cryptographic protocol configured to provide communication security over the Internet. TLS is an Internet Engineering Task Force ("IETF") standards track protocol as provided in, for example, IETF request for comments ("RFC") 2246, RFC 4346, RFC 5246, and/or RFC 6176.

In one embodiment, a first tunneling client 106 (included within first UE 102) together with tunneling server 116 establish and manage a first TSCF tunnel 110 according to the TSCF standard. In this embodiment, first UE 102 may use first TSCF tunnel 110 to traverse security devices (e.g., firewalls, proxies, etc.) and connect to tunneling server 116 to reach a service provider network for performing RTC. Similarly, network 100 includes a second tunneling client 108 (included within second UE 104) that together with tunneling server 116 establish and manage a second TSCF tunnel 112 according to the TSCF standard. Thus, second UE 104 may perform RTC by using second TSCF tunnel 112 to traverse security devices and reach a service provider network through tunneling server 116.

Figure 2:
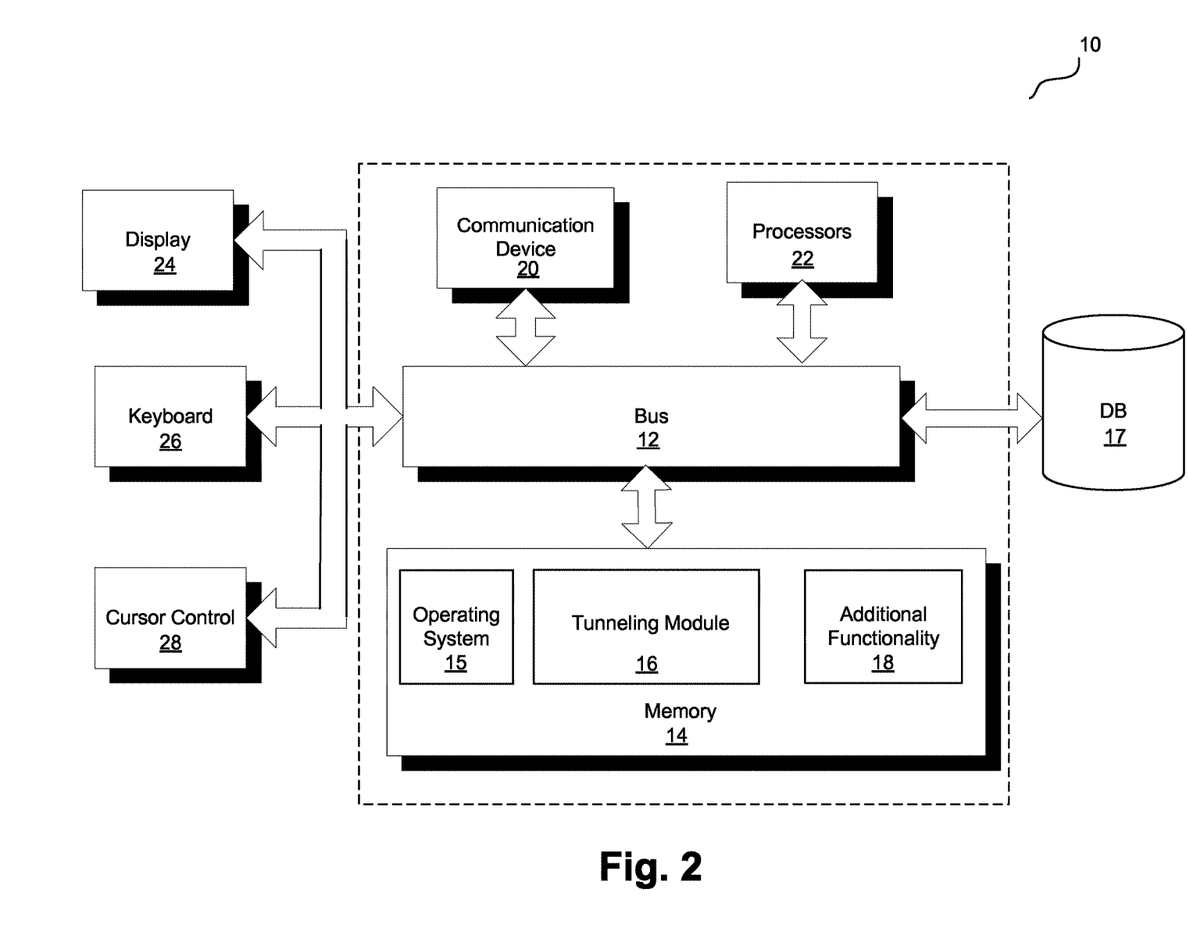
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a tunneling server 116, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18. In one embodiment, tunneling module 16 and/or additional functional modules 18 may include a receiving module that receives, by a tunneling server, a peer service request message from a first UE indicating a request for establishing a peer tunnel between the first UE and a second UE; a determining module that determines whether tunneling service is available at the second UE; and a sending module that, when tunneling service is available at the second UE, sends a first peer service response message back to the first UE including remote tunnel parameters corresponding to the second UE, as will be described herein with reference to FIG. 5.

Referring again to FIG. 1, with known systems, when two, typically co-located, tunneling clients (e.g., first tunneling client 106 at first UE 102 and second tunneling client 108 at second UE 104) connected to the same centralized tunneling server 116 are sending real-time media traffic to each other, all media traffic generally has to traverse tunneling server 116 for correct routing. For example, when two independent TSCF tunnels (i.e., first TSCF tunnel 110 and second TSCF tunnel 112) are used for exclusively sending and receiving traffic between first UE 102 and second UE 104, data frames are first received by a session director 118 within tunneling server 116, and then relayed to a corresponding endpoint based on, for example, a table lookup to determine correct routing. However, having to traverse tunneling server 116 introduces latency and packet loss and degrades the overall communications quality of RTC. In particular, if first UE 102 and second UE 104 are co-located and subject to RTC quality requirements such as minimal tolerable latency and packet loss, traversing tunneling server 116 may affect the call quality by introducing excessive network impairments. This degradation may also be aggravated if tunneling server 116 is many hops away from first UE 102 and second UE 104 within an IP network.

In contrast to the known systems, one embodiment of the present invention allows tunneling server 116 to instruct first UE 102 and second UE 104 to implement dynamic ad-hoc peer tunneling such that all media traffic goes directly from one client to the other. Accordingly, embodiments bypass tunneling server 116 and improve call quality. For example, instead of using two independent TSCF tunnels (i.e., first TSCF tunnel 110 and second TSCF tunnel 112) for exclusively sending and receiving traffic between first tunneling client 106 at first UE 102 and second tunneling client 108 at second UE 104, traffic is routed directly between first UE 102 and second UE 104 by implementing an endpoint detection mechanism and a subsequent peer tunnel creation to establish peer tunnel 120. In one example embodiment, second UE 104 includes a peer tunnel server 109 that behaves as a tunneling server for a peer tunnel client 107 at first UE 102 to establish peer tunnel 120.

In one embodiment, before sending frames, first tunneling client 106 at first UE 102 initiates a detection procedure in which tunneling server 116 relays a discovery message to second tunneling client 108 at second UE 104 (i.e., the destination) in order to know whether second UE 104 belongs to a tunnel being served by tunneling server 116. If it is determined that second UE 104 belongs to a tunnel being served by tunneling server 116, second UE 104 enters a listening mode (e.g., by using corresponding parameters)

and waits for first UE 102 to initiate peer tunnel 120 for direct communication between first UE 102 and second UE 104.

In one example embodiment, in order to initiate peer tunnel 120, second UE 104 temporarily behaves as a tunnel server by executing peer tunnel server 109, and waits for an incoming tunnel configuration request from peer tunnel client 107 at first UE 102. Upon receiving the configuration request, peer tunnel server 109 responds back with a configuration response, thus establishing peer tunnel 120. Thereafter, whenever frames are sent from first UE 102 to second UE 104 or from second UE 104 to first UE 102, the frames are encapsulated and propagated via peer tunnel 120.

One advantage of peer tunneling is that when network conditions are such that packet loss and latency are affecting the traffic between clients and session director 118, peer tunnel 120 provides a better tunneling configuration. This may be even more advantageous for co-located clients that can readily establish a peer tunnel with relatively better quality compared to the tunnels between the clients and tunneling server 116. Further, peer tunneling offloads traffic management from session director 118 to the clients themselves. Additionally, peer tunneling reduces latency by bypassing the inference of session director 118 on traffic routing.

In one embodiment, in order to enable peer tunneling, corresponding functionality may be enabled via TSCF configuration at session director 118. Further, a socket of interest (i.e., a socket configured for sending data between first UE 102 and second UE 104) is marked via a corresponding application programming interface ("API," such as tsc_setsockopt API at first tunneling client 106) to indicate that sent/received frames are candidates for peer tunneling. A network socket is an endpoint of an inter-process communication flow across a computer network according to a communications protocol.

One embodiment supports both datagram and stream sockets. A datagram socket is a type of connectionless network socket, which is the point for sending or receiving of packet delivery services. Each packet sent or received on a datagram socket is individually addressed and routed. A datagram is a basic transfer unit associated with a packet-switched network for which the delivery, arrival time, and order of arrival need not be guaranteed by the network. A stream socket is a type of internet socket which provides a connection-oriented and sequenced with mechanisms for creating and destroying connections and for detecting errors.

In one embodiment, once peer tunneling is enabled on a socket, there are no other API changes, and the client applications at first UE 102 and second UE 104 may continue utilizing the same function calls. Accordingly, peer tunneling usage is transparent to the end users at first UE 102 and second UE 104.

One embodiment provides functionality for peer tunneling when network 100 is subject to network address translation ("NAT"). NAT provides functionality for modifying network address information in IP datagram packet headers while they are in transit across a traffic routing device, and remaps one IP address space into another. In order to provide NAT support, peer tunneling candidates (e.g., first UE 102 and second UE 104) execute a NAT discovery procedure in order to acquire their IP and port address as seen by an endpoint that is not subject to NAT (i.e., an endpoint whose IP address is not remapped by NAT). This information is propagated alongside other tunnel parameters from the listening client (e.g., second UE 104) to the tunnel initiating client (e.g., first UE 102) as response to the peer tunneling service request during the far end detection.

In one embodiment, such tunnel parameters include the IP address, port, and transport type under which peer tunnel server 109 at second UE 104 will be expecting incoming tunnel configuration requests from peer tunnel client 107 at first UE 102. This information is propagated from first UE 102 to second UE 104 by tunneling server 116, which obtains this information from second UE 104 and forwards it to first UE 102.

In one embodiment, similar to first TSCF tunnel 110 and second TSCF tunnel 112, peer tunnel 120 as well is a TSCF tunnel compliant with TSCF tunnel management (e.g., tunnel initialization, maintenance, termination, etc., as defined by, e.g., 3GPP TR 33.830 V0.5.0) and TSCF tunnel transport protocols are supported for the negotiation of peer tunnel 120.

In one embodiment, assuming that tunneling server 116 is already configured to support peer tunneling functionality, if both first UE 102 and second UE 104 are configured/enabled as peer tunneling candidates (e.g., via the tsc_setsockopt API), only one peer tunnel is created by whatever client is able to propagate its peer service request first, and the other client reuses the same tunnel to send data in the opposite direction. Moreover if other sockets are configured with peer tunneling support while a peer tunnel already exists between the corresponding endpoints, no new tunnel is negotiated and the existent tunnel is used for this additional traffic.

In one embodiment, if peer tunnel negotiation between first UE 102 and second UE 104 fails for any reason, traffic continues flowing through session director 118 at tunneling server 116 via first TSCF tunnel 110 and second TSCF tunnel 112. In one embodiment, if peer tunnel 120 is removed by either first UE 102 or second UE 104 (e.g., by configuration release), traffic continues flowing through session director 118 at tunneling server 116 via first TSCF tunnel 110 and second TSCF tunnel 112. In one embodiment, when either or both of first TSCF tunnel 110 and second TSCF tunnel to session director 118 are removed, the corresponding peer tunnel 120 is also removed.

One embodiment provides a control message for exchanging configuration information between first UE 102 (and/or second UE 104) and tunneling server 116 to indicate peer tunnel detection. According to the TSCF standard, control messages between tunneling clients and a tunneling server are of a "request/response" type, and a control message response to a request includes either a corresponding reply or an error code indicating why the request could not be honored. TSCF control messages utilize a Type Length Value ("TLV") encoding. TLV is defined as the variable length concatenation of a unique Type (represented by an integer) and a Value containing the actual value identified by the Type.

In one embodiment, a client service request message is provided to indicate peer tunnel detection to tunneling server 116. In one embodiment, first UE 102 sends a request to tunneling server 116 for detecting the outer IP address, port, and transport type (e.g., TCP, User Datagram Protocol ("UDP"), etc.) of second UE 104 so that peer tunnel 120 can be created for direct communication between first UE 102 and second UE 104. In one example embodiment, second UE 104 may be running an older version of a software development kit ("SDK") and may not be able to comply with such request, in which case tunneling server 116 indicates to first UE 102 that the peer tunneling candidate (i.e., second UE 104) is not available for peer tunneling.

In one example embodiment, the service request type TLV configured for this client service request message is "peer service," including "connection info" TLV indicating the remote internal IP address of the requesting client. An internal IP address is the address that is assigned by a local network router and can only be seen by other computers in the local network. The response to this client service request is a client service response of the same type (i.e., "peer service") that includes a "connection info" TLV indicating the remote tunnel parameters and a "peer service response" TLV to indicate whether tunneling service is available or not at the destination endpoint.

In one example embodiment, client service request and response messages are forwarded by session director 118 to the corresponding endpoints. If the destination address does not belong to a valid tunnel client, a response indicating unavailable service is generated by session director 118 and not by the destination endpoint. If the request is forwarded to a valid tunnel client but no response is received, the initiating client assumes that no peer tunnel is possible and continues routing traffic through tunneling server 116. Table 1 provides example TLVs for implementing client service request/response for peer tunneling.

TABLE 1

Example TLVs for implementing client service request/response for peer tunneling

| TLV Type Name | Value | SEMANTICS | SHORT/ LONG FORMAT | VALUE TYPE | LENGTH | NOTES |
| --- | --- | --- | --- | --- | --- | --- |
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable_Header_Compression = 1 Disable_Header_Compression = 2 Enable_RTP_Redundancy = 3 Disable_RTP_Redundancy = 4 Peer Service = 5 |
| Peer Service Response | 32 | Peer Service Response | Short | Unsigned integer | 1 byte | Not Available = 1 Listening for clients = 2 Tunnel already Setup = 3 |

Figure 3:
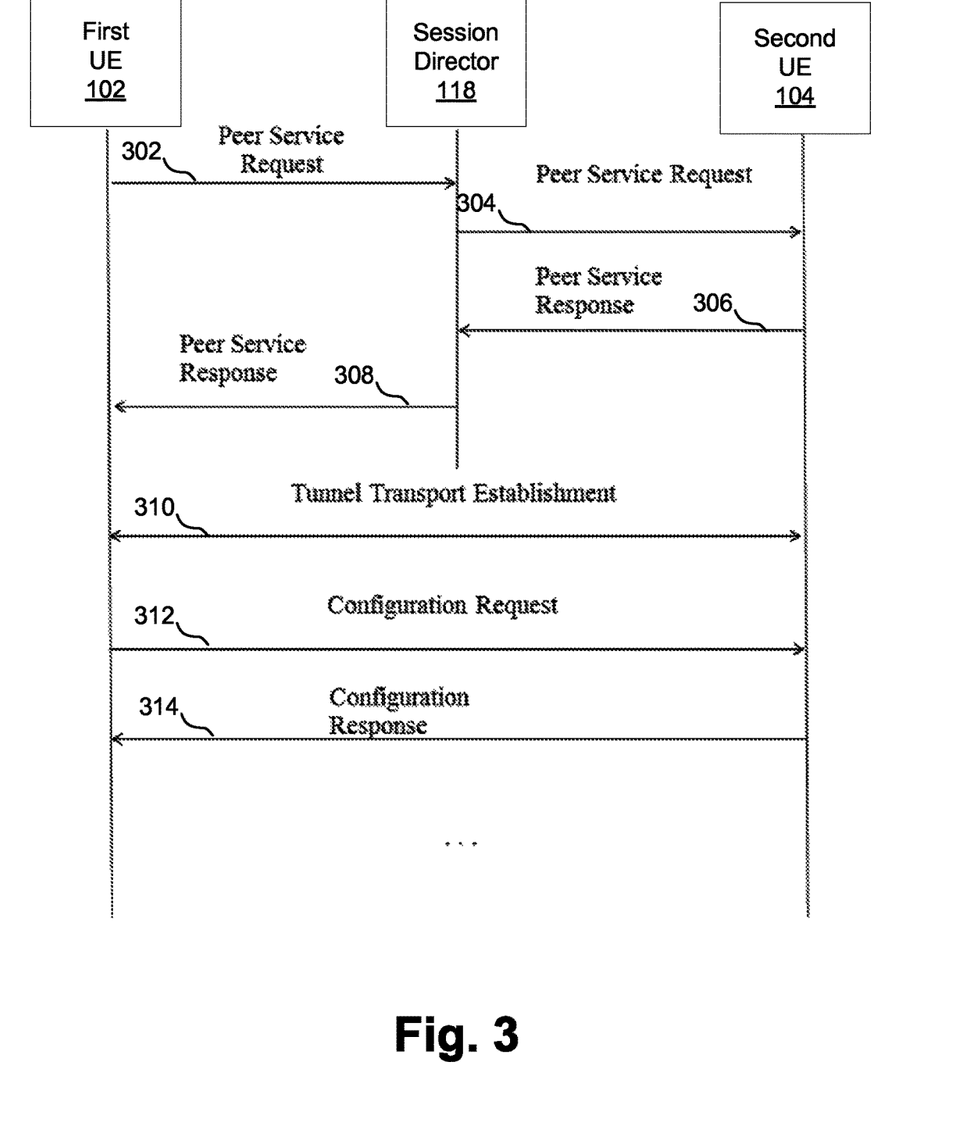
FIGS. 3 and 4 are message sequence diagrams corresponding to the operation of the tunneling module of FIG. 2 when performing tunneling in accordance with embodiments of the present invention.

FIG. 3 is an example message sequence diagrams corresponding to transactions in a successful tunnel creation, according to some present embodiments. Message sequence diagram of FIG. 3 includes network elements such as first UE 102, second UE 104, and session director 118, as described herein with reference to FIG. 1.

At 302, first UE 102 sends a peer service request message to session director 118 including the remote internal IP address of first UE 102.

At 304, session director 118 determines that tunneling service is available at second UE 104 and forwards the peer service request message of first UE 102 to second UE 104.

At 306, second UE 104 receives the peer service request message of first UE 102 from session director 118 and responds by sending a client service response message indicating that tunneling service is available and including remote tunnel parameters.

At 308, session director 118 forwards the peer service response message of second UE 104 to first UE 102.

At 310, upon completing the exchange of "peer service" client service response/response messages, peer tunnel client 107 at first UE 102 and peer tunnel server 109 at second UE 104 perform tunnel transport establishment.

For example, if peer tunnel server 109 is listening on TCP, the TCP connection is negotiated for tunnel transport establishment. If peer tunnel server 109 is using TLS, encryption negotiation is also performed. If peer tunnel server 109 is using Datagram Transport Layer Security ("DTLS"), only encryption negotiation is performed. If peer tunnel server 109 is using UDP, there is no negotiation needed.

At 312, peer tunnel client 107 sends a configuration request message to peer tunnel server 109, and at 314, peer tunnel server 109 responds to the configuration request message of peer tunnel client 107 by a configuration response message. Configuration request and response messages allow for peer tunnel client 107 to obtain configuration information for peer tunnel 120, as described in, for example, 3GPP TR 33.830 V0.5.0. Upon completing the exchange of configuration request/response messages, peer tunnel client 107 and peer tunnel server 109 may use peer tunnel 120 for performing RTC.

Figure 4:
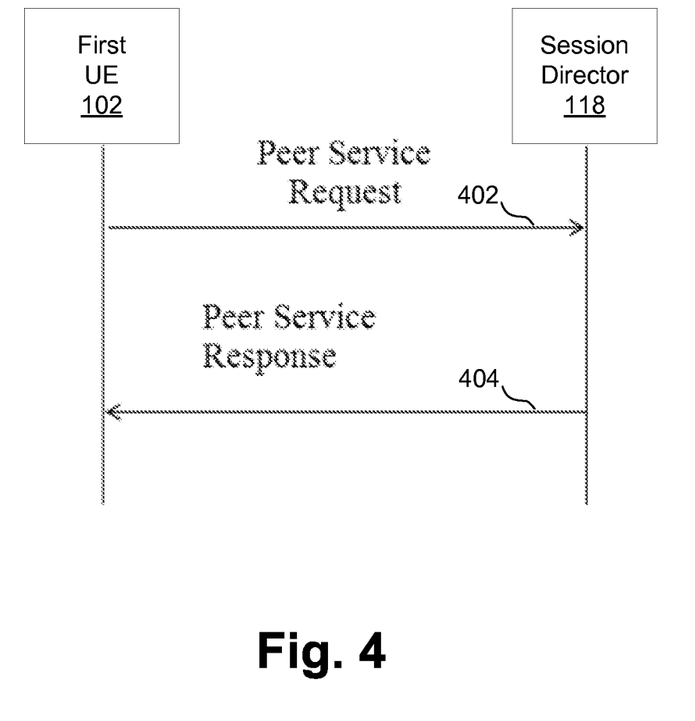

FIG. 4 is an example message sequence diagrams corresponding to transactions in a failed tunnel creation, according to some present embodiments. Message sequence diagram of FIG. 4 includes network elements such as first UE 102 and session director 118, as described herein with reference to FIG. 1.

At 402, first UE 102 sends a peer service request message to session director 118 including the remote internal IP address of first UE 102.

At 404, session director 118 determines that tunneling service is not available at second UE 104. For example, session director 118 may determine that second UE 104 does not belong to a TSCF tunnel. Accordingly, session director 118 sends a peer service respond message back to first UE 102 indicating a failed tunnel creation (i.e., second UE 104 is not available).

One embodiment provides a SDK to enable peer tunneling on a per socket basis at first UE 102 and/or second UE 104. In one example embodiment, a function "tsc_setsockopt" is used at the SDK to configure a socket, and an option for a "SOL_SOCKET" parameter in function "tsc_setsockopt" is provided to enable or disable peer tunneling. One example configuration of this function is:

int tsc_setsockopt(int s, int level, int optname, char *optval, int optlen);

whete "optname" parameter is used for providing configuration options. The "optname" value related to peer tunneling is:

#define SO_TSC_PEER_TUNNEL 102 and possible corresponding "optval" values are:

#define SO_TSC_PEER_TUNNEL_SERVER_ONLY 0

#define     SO_TSC_PEER_TUNNEL_PEER_PREFERRED 1

#define SO_TSC_PEER_TUNNEL_PEER_ONLY 2

Figure 5:
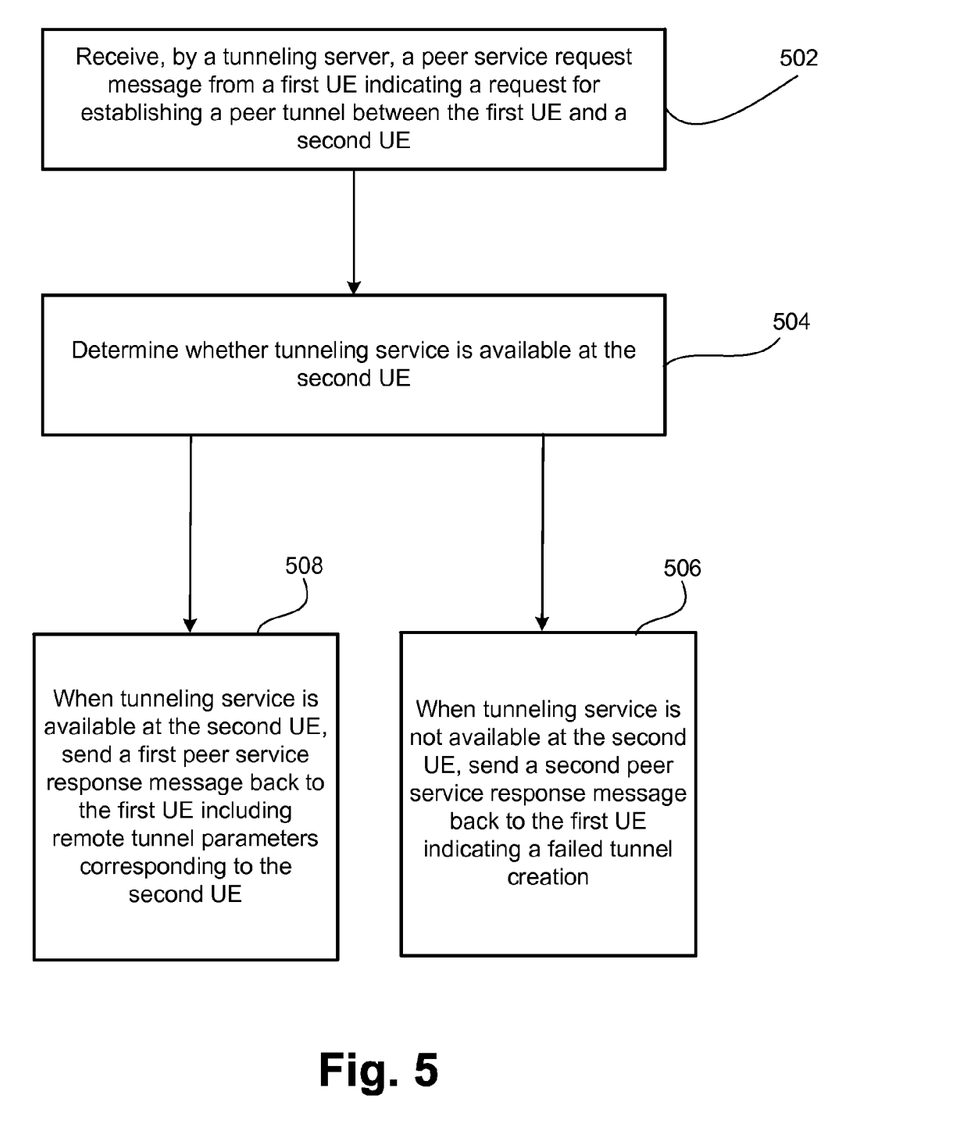
FIG. 5 is a flow diagram of the operation of the tunneling module of FIG. 2 when performing tunneling in accordance with embodiments of the present invention.

One example configuration for enabling peer tunneling using function "tsc_setsockopt" is as follows:

int enable=SO_TSC_PEER_TUNNEL_PEER_ PREFERRED;

tsc_setsockopt(socket, SOL_SOCKET, SO_TSC_PEER_TUNNEL, (char *)&enable, sizeof(int));

and the corresponding configuration for disabling peer tunneling is as follows:

int disable=SO_TSC_PEER_TUNNEL_SERVER_ONLY;

tsc_setsockopt(socket, SOL_SOCKET, SO_TSC_PEER_TUNNEL, (char *)&disable, sizeof(int));

FIG. 5 is a flow diagram of tunneling module 16 of FIG. 2 and/or tunneling server 116 of FIG. 1 when performing tunneling in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, tunneling server 116 receives a peer service request message from first UE 102 via first TSCF tunnel 110 indicating a request for establishing peer tunnel 120 between first UE 102 and second UE 104. In one embodiment, the peer service request message includes a remote internal IP address corresponding to first UE 102.

At 504, tunneling server 116 determines whether tunneling service is available at second UE 104. For example, tunneling server 116 may forward the peer service request message of first UE 102 to second UE 104 via second TSCF tunnel 112 and subsequently receive a corresponding peer service response message from second UE 104. Alternatively, tunneling client 116 may determine that second UE 104 does not belong to a TSCF tunnel and subsequently generate a peer service response message indicating that tunneling service is not available at second UE 104.

At 506, when it is determined that tunneling service is not available at second UE 104, tunneling server 116 sends a corresponding peer service response message back to first UE 102 indicating a failed tunnel creation.

Alternatively, at 508, when it is determined that tunneling service is available at second UE 104, tunneling server 116 sends a corresponding peer service response message back to first UE 102 including remote tunnel parameters corresponding to second UE 104. Upon reception of the client service response message, first UE 102 and second UE 104 perform tunnel transport establishment for peer tunnel 120 which is a TSCF tunnel. Subsequently, peer tunnel client 107 and peer tunnel server 109 exchange configuration request/response messages corresponding to configuration information of peer tunnel 120.

As disclosed, embodiments allow for dynamic creation of a peer tunnel between tunneling clients to bypass a tunneling server and route RTC traffic through the peer tunnel to reduce latency and packet loss. Further, the load and complexity of the tunneling server is reduced by dynamically offloading tunneling functionality to the tunneling clients themselves. Creation and management of such peer tunnel is implemented by tunneling clients and assisted by a tunneling server. Accordingly, embodiments give the end user the possibility of uninterrupted RTC in a cost-effective and secure way while also meeting real-time application quality requirements.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to manage peer tunneling for real time communication (RTC), the managing of the peer tunneling comprising:
    receiving, by a tunneling server, a peer service request message from a first user equipment (UE) indicating a request for establishing a peer tunnel between the first UE and a second UE;
    determining if tunneling service is available at the second UE, and
    when tunneling service is determined to be available at the second UE:
        sending, from the tunneling server, a first peer service response message back to the first UE including remote tunnel parameters corresponding to the second UE allowing for the establishment of a peer tunnel based on a configuration request message from the first UE to the second UE to obtain configuration information; and
    determining if tunnel service is not available at the second UE, and when tunneling service is determined not to be available at the second UE:
        determining that the second UE does not belong to a tunneled services control function (TSCF) tunnel and sending, from the tunneling server, a second peer service response message back to the first UE indicating a failed tunnel creation.

2. The non-transitory computer-readable medium of claim 1,
    wherein the peer service request message is received via a tunneled services control function (TSCF) tunnel,
    wherein the peer service request message includes a remote internal internet protocol (IP) address corresponding to the first UE.

3. The non-transitory computer-readable medium of claim 1, wherein the determining of whether tunneling service is available at the second UE comprises:
    forwarding the peer service request message of the first UE to the second UE via a tunneled services control function (TSCF) tunnel; and
    receiving the first peer service response message or the second peer service response message from the second UE.

4. The non-transitory computer-readable medium of claim 1,
    wherein, upon reception of the first peer service response message by the first UE, the first UE and the second UE perform tunnel transport establishment for the peer tunnel between the first UE and the second UE,
    wherein the peer tunnel is a tunneled services control function (TSCF) tunnel.

5. The non-transitory computer-readable medium of claim 4,
    wherein, upon establishing the peer tunnel, the first UE sends a configuration request message to the second UE to obtain configuration information for the peer tunnel,
    wherein the second UE responds to the configuration request message of the first UE by a configuration response message.

6. A method for peer tunneling for real time communication (RTC), comprising:
    receiving, by a tunneling server, a peer service request message from a first user equipment (UE) indicating a request for establishing a peer tunnel between the first UE and a second UE;
    determining if tunneling service is available at the second UE, and when tunneling service is determined to be available at the second UE:
        sending, from the tunneling server, a first peer service response message back to the first UE including remote tunnel parameters corresponding to the second UE allowing for the establishment of a peer tunnel based on a configuration request message from the first UE to the second UE to obtain configuration information; and
    determining if tunnel service is not available at the second UE, and when tunneling service is determined not to be available at the second UE:
        determining that the second UE does not belong to a tunneled services control function (TSCF) tunnel and sending, from the tunneling server, a second peer service response message back to the first UE indicating a failed tunnel creation.

7. The method of claim 6,
    wherein the peer service request message is received via a tunneled services control function (TSCF) tunnel,
    wherein the peer service request message includes a remote internal internet protocol (IP) address corresponding to the first UE.

8. The method of claim 6, wherein the determining of whether tunneling service is available at the second UE comprises:
    forwarding the peer service request message of the first UE to the second UE via a tunneled services control function (TSCF) tunnel; and
    receiving the first peer service response message or the second peer service response message from the second UE.

9. The method of claim 6,
wherein, upon reception of the first peer service response message by the first UE, the first UE and the second UE perform tunnel transport establishment for the peer tunnel between the first UE and the second UE,
wherein the peer tunnel is a tunneled services control function (TSCF) tunnel.

10. The method of claim 9,
wherein, upon establishing the peer tunnel, the first UE sends a configuration request message to the second UE to obtain configuration information for the peer tunnel,
wherein the second UE responds to the configuration request message of the first UE by a configuration response message.

11. A system for peer tunneling for real time communication (RTC), comprising:
a hardware processor configured to:
receive, by a tunneling server, a peer service request message from a first user equipment (UE) indicating a request for establishing a peer tunnel between the first UE and a second UE;
determine if tunneling service is available at the second UE, and when tunneling service is determined to be available at the second UE:
send from the tunneling server a first peer service response message back to the first UE including remote tunnel parameters corresponding to the second UE allowing for the establishment of a peer tunnel based on a configuration request message from the first UE to the second UE to obtain configuration information; and
determine if tunnel service is not available at the second UE, and when tunneling service is determined not to be available at the second UE:
determine that the second UE does not belong to a tunneled services control function (TSCF) tunnel and send, from the tunneling server, a second peer service response message back to the first UE indicating a failed tunnel creation.

12. The system of claim 11,
wherein, when tunneling service is not available at the second UE, the system sends the second peer service response message back to the first UE indicating a failed tunnel creation.

13. The system of claim 12,
wherein the peer service request message is received via a tunneled services control function (TSCF) tunnel,
wherein the peer service request message includes a remote internal internet protocol (IP) address corresponding to the first UE.

14. The system of claim 12, further determines whether tunneling service is available at the second UE by:
forwarding the peer service request message of the first UE to the second UE via a tunneled services control function (TSCF) tunnel; and
receiving the first peer service response message or the second peer service response message from the second UE.

15. The system of claim 12,
wherein, upon reception of the first peer service response message by the first UE, the first UE and the second UE perform tunnel transport establishment for the peer tunnel between the first UE and the second UE,
wherein the peer tunnel is a tunneled services control function (TSCF) tunnel.

16. The system of claim 15,
wherein, upon establishing the peer tunnel, the first UE sends a configuration request message to the second UE to obtain configuration information for the peer tunnel,
wherein the second UE responds to the configuration request message of the first UE by a configuration response message.

* * * * *

UNITED STATES PATENT AND TRADEMARK OFFICE
CERTIFICATE OF CORRECTION

PATENT NO. : 9,647,982 B2
APPLICATION NO. : 14/636755
DATED : May 9, 2017
INVENTOR(S) : Herrero et al.

Page 1 of 1

It is certified that error appears in the above-identified patent and that said Letters Patent is hereby corrected as shown below:

In the Specification

In Column 4, Line 6, after "FIG. 5" insert -- . --.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*